United States Patent Office 2,987,535
Patented June 6, 1961

2,987,535
PREPARATION OF ALUMINUM TRIALKYLS
Stanley B. Mirviss, Westfield, and Elroy J. Inchalik, Cranford, N.J., assignors to Esso Research and Engineering Company, a corporation of Delaware
No Drawing. Filed May 20, 1958, Ser. No. 736,469
9 Claims. (Cl. 260—448)

This invention relates to the production of aluminum alkyls. More particularly, this invention relates to the production of aluminum trialkyls by a concomitant addition-substitution reaction involving specific aluminum alkyl hydride molecules.

It is known in the prior art to react aluminum trialkyls with olefins in the presence of a catalyst at elevated temperatures and pressures to cause a displacement of the alkyl radicals by the olefin molecules, thus producing new aluminum trialkyl products. It is known, for example, that aluminum triisobutyl or other aluminum trialkyls may be reacted with 3 moles of butene-1 in the presence of a nickel catalyst to produce one mole of aluminum tri n-butyl and 3 moles of isobutylene. Similarly, one mole of aluminum tributyl when reacted with 3 moles of decene-1 under catalysis at elevated temperatures and pressures will produce one mole of aluminum tri-decyl and 3 moles of isobutylene. In general, aluminum trialkyls can be reacted with any olefin to cause a displacement of the alkyl groups for the production of the novel aluminum trialkyl and the liberation of the alkyl groups to form the corresponding olefin. Olefins such as ethylene, propylene, butylene, pentene, hexene, heptene, octene, nonene, decene and so on up to about $C_{20}$ have been employed. The olefins may be straight chained or branched to any degree desired, and preferably the olefins have the double bond in the alpha position. This reaction is an extremely important one since the aluminum trialkyl product obtained may be further reacted with numerous agents to produce such valuable end products as short or long chain alcohols which may be straight or branched chained, corresponding acids, ketones and the like. These aluminum trialkyls are of particular importance for the production of straight chain alcohols which are otherwise difficult to obtain. An economical method for the production of high purity aluminum trialkyls is critical to the production of low cost alcohols and the like via this route. It is not intended, however, to restrict this application to the utilization of the aluminum trialkyls formed, but rather to provide a novel superior process for their preparation.

It has now been found that high yields of aluminum trialkyl compounds may be produced by a concomitant addition-substitution reaction involving at least 3 moles of the desired olefin and one mole of aluminum diisobutyl hydride. As reactant, aluminum diisobutyl hydride is far superior to aluminum trialkyls to an extent that a catalyst generally required for this type of reaction is not necessary. Also, by resort to the use of aluminum diisobutyl hydride, the unwanted bottoms or heavy material obtained due to side reactions are considerably minimized and unwanted dimer olefins also resulting from side reactions are maintained at a very low level.

In this novel reaction, one mole of olefin reactant adds to the aluminum through the Al-H bond concomitantly with the substitution of one mole of olefin for each of the isobutyl radicals.

In accordance with this invention, aluminum diisobutyl hydride is one of the reactants. The other reactant is any desired olefin such as those recited above. The reaction temperature may vary considerably, e.g. 50 to 200° C.; the preferred range is 80–165° C. The pressure may be varied over a wide range, e.g. 0 to 3000 p.s.i.g., and is limited by practical and economic considerations. At least small amounts of pressure are in many cases desired especially with lighter olefin reactants to maintain sufficient liquid olefin present, thus permitting good contact between olefin and aluminum diisobutyl hydride. This process can be conducted with the olefin in either liquid or gaseous phase. As previously noted, a catalyst such as nickel, cobalt, platinum, palladium and molybdenum has been suggested in the prior art and may be employed for the present process; however, surprisingly good results have been obtained using aluminum diisobutyl hydride without resort to catalysis. Preparation of aluminum trialkyls in accordance with the prior art processes is cumbersome and extremely slow without a catalyst. In many cases the dimeric olefin by-product cannot be readily separated from the principal product by fractionation due to the decomposition temperature of the aluminum alkyls present. It is, therefore, desirable to obtain an aluminum alkyl product of high purity and having initially a low dimer content. To illustrate the unexpected and superior results obtainable by resort to the present invention, a series of tests were carried out comparing prior art processes with those falling within the scope of this invention. The results set forth in column A represent the average of seven consecutive runs, in column B the results represent the average of eight consecutive runs, and in column C two runs were carried out with the specific results set forth. In column C where two numbers are shown, the one on the left represents one run, and the other number the second run.

Examples 1–17

| Method | A | B | C |
|---|---|---|---|
| Starting Materials | Al(i-Bu)$_3$ | Al(i-Bu)$_2$H Butene 1 | |
| Catalyst, percent | b 0.05–0.1 | None | None |
| Butene-1/Al, mole ratio | 10 | 10 | 7.3 |
| Reaction Conditions: | | | |
| Temperature, °C | 110–115 | 110–115 | 135/140 |
| Time, Hours | 18 | 18.5 | 7 |
| Mole Percent Yield, on Al: | | | |
| Al(n-butyl)$_3$ | 71 | 80.3 | 78/79 |
| "Bottoms" a | 31 | 15.6 | 15 |
| Mole Percent Yield, (on butene-1): | | | |
| Butene Dimer (2-Et-hexene-1) | 18.5 | 7.0 | 9.5 |
| Al(n-butyl)$_3$ Purity, mole percent | 87 | 97 | 95/96 | a High molecular weight dimerization and decomposition products boiling well above the aluminum tri-n-butyl boiling range.
b Ni.

The results of the above runs indicate the following:

(1) The runs employing aluminum diisobutyl hydride in absence of a catalyst were superior to those employing aluminum triisobutyl in the presence of a catalyst with regard to the yield of product, purity, relatively low undesired bottoms and butene dimer production. Additionally, a run was carried out with aluminum triisobutyl at 123° C. and 250 p.s.i.g. in the absence of a catalyst and it required 36 hours to obtain a comparable yield.

(2) Employing the concomitant addition-substitution reaction of this invention, it was possible to utilize higher temperatures, e.g. 135–140° C., for a shorter period of time, i.e. 7 hours, while maintaining the bottoms and dimer production below that obtained employing aluminum triisobutyl as a reactant. This is a significant factor since the elevated temperatures tend to cause the production of undesired bottoms and/or dimer product.

(3) It was possible in accordance with this invention to use relatively short residence times and still maintain excellent yields with low production of undesirable compounds.

(4) Under comparable conditions, the purity of aluminum trialkyl product is far superior when employing conditions of this invention.

It is evident that the two moles of isobutylene (per mole of aluminum diisobutyl hydride) produced as a result of the substitution portion of the concomitant addition-substitution reaction may be separated and reused for the preparation of fresh aluminum diisobutyl hydride in accordance with known techniques. This feature is a practical one which will find applicability in any commercial plant design but is not a critical part of this invention. The preparation of aluminum diisobutyl hydride is well known in the art and need not be described herein. Although it is indicated that 3 moles of olefin will react with the aluminum diisobutyl hydride, it is apparent and within the scope of this invention to employ excess quantities of the olefin. Generally, it is preferable to employ from 3 to 20 moles of the olefin per mole of aluminum diisobutyl hydride. Also, a solvent such as hexane, heptane, other aliphatics, aromatics such as benzene, toluene, xylene, etc. may be employed if desired. Cycloaliphatics and chlorinated aromatics are also suitable. Any solvent which is inert to the reaction may be employed.

To illustrate the preparation of additional aluminum alkyls, reference may be had to the following examples.

*Example 18*

12 moles of heptene-1 are contacted with one mole of aluminum diisobutyl hydride at 125° C. and 50 p.s.i.g. for a period of 15 hours. The resultant product will comprise aluminum triheptyl in a yield of 85 mole percent.

*Example 19*

12 moles of decene-1 are contacted with one mole of aluminum diisobutyl hydride at 130° C. and 5 p.s.i.g. for a period of 12 hours. The resultant product will comprise aluminum tridecyl in a yield of 87 mole percent.

What is claimed is:

1. A process for producing aluminum trialkyls which comprises reacting an alpha olefin with aluminum diisobutyl hydride at a mole ratio of at least 3 to 1 at a temperature of 50–200° C. and a pressure of 0–3000 p.s.i.g. whereby one mole of said olefin adds on to said aluminum diisobutyl hydride and two moles of said olefin substitute for the two diisobutyl radicals and the alkyl radicals of the aluminum trialkyl product produced correspond in chain length to the olefin reactant.

2. A process in accordance with claim 1 wherein said olefin is a normal olefin and said product is an aluminum tri normal alkyl.

3. A process in accordance with claim 1 wherein said olefin reactant is maintained in liquid phase.

4. A process for the production of an aluminum tri-n-alkyl which comprises reacting a normal alpha olefin with aluminum diisobutyl hydride in a mole ratio of 3 to 20:1, at a temperature of 50–200° C. and a pressure of 0–3000 p.s.i.g. in the presence of a displacement catalyst for a period of time sufficient to concomitantly add 1 mole of olefin per mole of aluminum diisobutyl hydride and substitute 2 moles of olefin for the two isobutyl radicals contained in each mole of aluminum diisobutyl hydride whereby said aluminum tri-n-alkyl is formed.

5. A process in accordance with claim 4 wherein said olefin reactant is maintained in liquid phase.

6. A process in accordance with claim 4 wherein an inert solvent is employed.

7. A process for the production of aluminum tri-n-alkyl which comprises reacting a normal alpha $C_2$ to $C_{20}$ olefin with aluminum diisobutyl hydride in a molar ratio of about 7 to 20:1 at a temperature of 50 to 200° C. and a pressure of 0 to 3000 p.s.i.g. for a sufficient period of time to concomitantly add 1 mole of said olefin to a mole of said aluminum diisobutyl hydride and substitute 2 moles of said olefin for the two isobutyl radicals contained in each mole of said aluminum diisobutyl hydride whereby aluminum tri-n-alkyl is formed.

8. A process in accordance with claim 7 wherein said reaction is carried out in the presence of a nickel containing catalyst.

9. A process for the production of an aluminum tri-n-butyl which comprises reacting a normal butene-1 with aluminum diisobutyl hydride in a molar ratio of about 7 to 20:1 at a temperature of 80 to 165° C. and a pressure of 0 to 3000 p.s.i.g. for a sufficient period of time to concomitantly add 1 mole of said butene-1 to a mole of said aluminum diisobutyl hydride and substitute 2 moles of said butene-1 for the two isobutyl radicals contained in each mole of the aluminum diisobutyl hydride whereby said aluminum tri-n-butyl is formed.

References Cited in the file of this patent

UNITED STATES PATENTS

| | | |
|---|---|---|
| 2,826,598 | Ziegler | Mar. 11, 1958 |
| 2,835,689 | Ziegler | May 20, 1958 |